(12) United States Patent
Pautler et al.

(10) Patent No.: US 9,591,176 B2
(45) Date of Patent: Mar. 7, 2017

(54) SKEW ANGLE DETERMINATION

(75) Inventors: Joseph Pautler, Carrollton, TX (US);
Alan Hunt, Dallas, TX (US); Ralph Payne, Dallas, TX (US)

(73) Assignee: Authentix, Inc., Addison, TX (US)

( * ) Notice: Subject to any disclaimer, the term of this patent is extended or adjusted under 35 U.S.C. 154(b) by 0 days.

(21) Appl. No.: 14/386,287

(22) PCT Filed: Apr. 6, 2012

(86) PCT No.: PCT/US2012/032599
§ 371 (c)(1),
(2), (4) Date: Sep. 18, 2014

(87) PCT Pub. No.: WO2013/151560
PCT Pub. Date: Oct. 10, 2013

(65) Prior Publication Data
US 2015/0029561 A1     Jan. 29, 2015

(51) Int. Cl.
*H04N 1/387* (2006.01)
*G06K 9/32* (2006.01)
*G06K 9/52* (2006.01)

(52) U.S. Cl.
CPC ......... *H04N 1/3878* (2013.01); *G06K 9/3275* (2013.01); *G06K 9/522* (2013.01)

(58) Field of Classification Search
None
See application file for complete search history.

(56) References Cited

U.S. PATENT DOCUMENTS

| 5,923,413 A * | 7/1999 | Laskowski | G07D 7/12 356/434 |
| 8,194,237 B2 | 6/2012 | Cronin et al. | |
| 2003/0023153 A1* | 1/2003 | Izatt | A61B 5/0066 600/407 |
| 2009/0175539 A1* | 7/2009 | Jahromi | G06K 9/00026 382/181 |
| 2010/0067826 A1* | 3/2010 | Honsinger | G06K 9/3275 382/280 |

FOREIGN PATENT DOCUMENTS

| WO | 2011047235 A1 | 4/2011 |
| WO | 2013151560 A1 | 10/2013 |

OTHER PUBLICATIONS

Foreign communication from the priority application—International Search Report and Written Opinion, PCT/US2012/032599, Jun. 20, 2012, 9 pages.
Foreign communication from the priority application—International Preliminary Report on Patentability, PCT/US2012/032599, Oct. 7, 2014, 8 pages.

(Continued)

*Primary Examiner* — Christopher D Wait
(74) *Attorney, Agent, or Firm* — Conley Rose, P.C.; Rodney B. Carroll (57) ABSTRACT

The skew angle of a document image is determined or estimated. The skew angle is determined or estimated by examining patterns found within a Fast Fourier Transform of a subset of the document image. This technique exploits the internal structure of the document designs to allow fast and accurate skew angle estimation, including for arbitrary document fragments.

24 Claims, 11 Drawing Sheets

(56) References Cited

OTHER PUBLICATIONS

Lowther, S., et al., "An accurate method for skew determination in document images," DICTA2002: Digital Image Computing Techniques and Applications, Jan. 21-22, 2002, Melbourne, Australia, pp. 1-5.

Peake, G. S., et al., "A general algorithm for document skew angle estimation," 1997, pp. 230-233, IEEE.

* cited by examiner

SKEW ANGLE DETERMINATION

CROSS-REFERENCE TO RELATED APPLICATIONS

This Application is a filing under 35 U.S.C. 371 of International Application No. PCT/US2012/032599 filed Apr. 6, 2012, entitled "Skew Angle Determination," which application is incorporated by reference herein in its entirety.

FIELD OF INVENTION

The present invention relates in general to processing of document-based images, and in particular, to determining a rotational skew angle of a document image.

BACKGROUND

When banknotes (may also be referred to as "notes" herein) pass through a high-speed transport system along a banknote transport path, the banknotes may tend to run through at non-zero angles relative to the transport centerline. As a result, the images of such banknotes taken by an optical sensor positioned in proximity to the transport system will be skewed. The skew angle of the banknote must be determined (or at least estimated within a specified criteria) in order for many types of banknote processes to perform correctly. Since this skew angle can be random from banknote to banknote, a skew angle determination method must estimate the angle based solely on information collected from the current banknote instead of relying on information from prior banknotes or from a calibration procedure. Further, some banknotes may be torn and lack a regular rectangular border. Such banknote fragments cause significant problems for geometric-based algorithms. Yet still further, banknotes tend to have more printed features that are vertically aligned (i.e., aligned along the lengthwise axis of a banknote (for example, the axis aligned vertically with the page of the example note shown in FIG. 3A)) than typical text documents that mostly or only contain lines of text (which are horizontally aligned). Therefore, it is much more difficult to determine the skew angle of a banknote (or any document that contains a larger percentage of printed images relative to printed text) than a skew angle of a typical text-dominated document.

U.S. patent application Ser. No. 12/904,908, which is hereby incorporated by reference herein, disclosed a document sensor system for creating images of scanned documents (e.g., banknotes) in anticipation of performing various processes on such images. The present application provides details of processes for determining or estimating the skew angle of a document, such as those that pass through the document sensor system described in Ser. No. 12/904,908. Various aspects of this document sensor system are repeated herein in order to assist in describing how the present invention may operate in a document sensor system. Note, however, that embodiments of the present invention are not limited to implementations within such a document sensor system.

As previously noted, determining the skew angle of a banknote image is an important prerequisite for many banknote processes. Skew correction requires the determination of a skew angle and the modification of a document image representation based on the skew angle. Embodiments of the present invention estimate the skew angle by examining patterns found within a two-dimensional Fast Fourier Transform ("FFT") of a subset of the banknote image. This technique exploits the internal structure of currency (banknote) designs to allow fast and accurate skew angle estimation for arbitrary banknote fragments that are problematic for existing solutions. The terms "skew angle determination," "skew angle estimation," and "skew angle estimate" are used interchangeably herein. When the skew angle is determined, its value is an estimate that is a function of the parameters used in the systems and methods described herein.

DETAILED DESCRIPTION

It will be readily understood that the components of the present invention, as generally described and illustrated in the figures herein, may be arranged and designed in a wide variety of different configurations. Thus, the descriptions of the embodiments of the present invention, as represented in the figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "embodiments," "example embodiments," "some embodiments," or other similar language, throughout this specification refers to the fact that a particular feature, structure, or characteristic described in connection with the embodiment may be included in at least one embodiment of the present invention. Thus, appearances of the phrases "embodiments," "example embodiments," "in some embodiments," "in other embodiments," or other similar language, throughout this specification do not necessarily all refer to the same group of embodiments, and the described features, structures, or characteristics may be combined in any suitable manner in one or more embodiments.

In the disclosure that follows, elements not specifically shown or described may take various forms well known to those skilled in the art. The use of "including," "comprising," or "having," "containing," "involving," and variations thereof herein, is meant to encompass the items listed thereafter and equivalents thereof as well as additional items.

Embodiments of the present invention provide a document sensor that detects features, characteristics, and/or attributes of documents, including, but not limited to, banknotes and drafts. The remainder of the description exemplifies applications related to banknotes and related examples. However, such image capturing configurations may be applicable to any document, including, but not limited to, identification credentials, security labels, packaging, or any surface that may be digitally scanned. Furthermore, embodiments of the present invention are not to be limited to documents, but may be applicable to any target or object that can be imaged in accordance with such embodiments. The image capturing sensor may perform certain operations to determine the presence and/or authenticity of a spectrally unique feature present in banknotes, the denomination of banknotes, the fitness of banknotes, and/or the presence of multiple banknotes. The digital image scanning device may include data adjustments (e.g., normalization) based on a calibration process to produce images that faithfully and consistently represent the target or object.

In embodiments described herein, a digitized image of a target or object (the terms "target" and "object" may be used interchangeably herein) is received by a processing device from a digital image scanning device. The scanning device can be, for example, a flatbed scanner, book scanner, sheet fed scanner, digital camera, or any other digital imaging device, such as disclosed in U.S. patent application Ser. No. 12/904,908, and further described herein as "line scan imaging." The scanning device provides the image in the form of image pixels or, equivalently, as "image pixel data," "pixel data," "pixel data values," or "pixel values," as these terms are conventionally understood by those skilled in the image processing arts. The terms "image" and "images" are used herein to refer to data collected as a result of the detection of light energy scattered, reflected, and/or filtered by a target or object, which resulted from illumination of the target or object by one or more light sources. It is not necessary that such "images" be either visible or displayed on a display device, though for purposes of describing embodiments of the present invention, one or more figures referenced herein may illustrate such an "image" or "images." Herein, the terms "scattered" and "reflected" may be used interchangeably to describe the light received by detectors, emanating from the target or object as it is illuminated by one or more light sources. As disclosed herein, an "image" may be comprised of "pixels," which essentially identify a predetermined location of a predetermined size (area) on the target or object being examined.

According to embodiments of the present invention, to produce a digitized image, "line scan imaging" may be used to produce a line of illumination that is spatially swept relative to an object (e.g., a document) to be characterized, such as for purposes of authentication, and resultant scattered and/or reflected light is then sensed or captured by a linear detector. Due to the relative motion between the optics and the object, multiple sequential line images build up to form the captured image. This configuration provides an ability to form images or multi-spectral image stacks of fast moving items, such as banknotes or manufactured items, which may be transported along a banknote transport path by or on a moving conveyer system.

Figure 1:
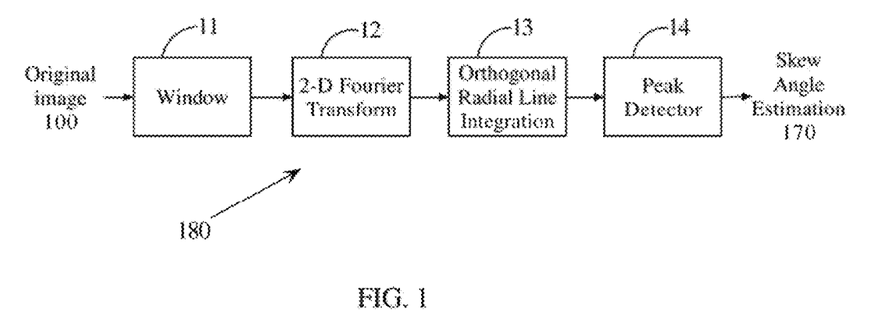
FIG. 1 illustrates a block diagram of a system and process for estimating a skew angle of an image.

FIG. 1 illustrates a block diagram of a skew angle determination process 180, which is further described with respect to determining a skew of a target or object, which in examples described herein may be a banknote. The skew angle determination process 180 may use a generic, FFT-based algorithm that provides robust angle estimates from an arbitrary document fragment. The received scanned image 100 (e.g., an unprocessed or raw image from a calibrated image sensor) may comprise 256×256 grayscale pixels at a resolution of 0.4 mm per pixel. This size and resolution is sufficient to capture a portion (e.g., the first half) of a presented banknote in the system and provide a skew angle estimation 170 accurate to within 0.25 degrees. Note, however, that the present invention is not limited to such a specific resolution.

Figure 2:
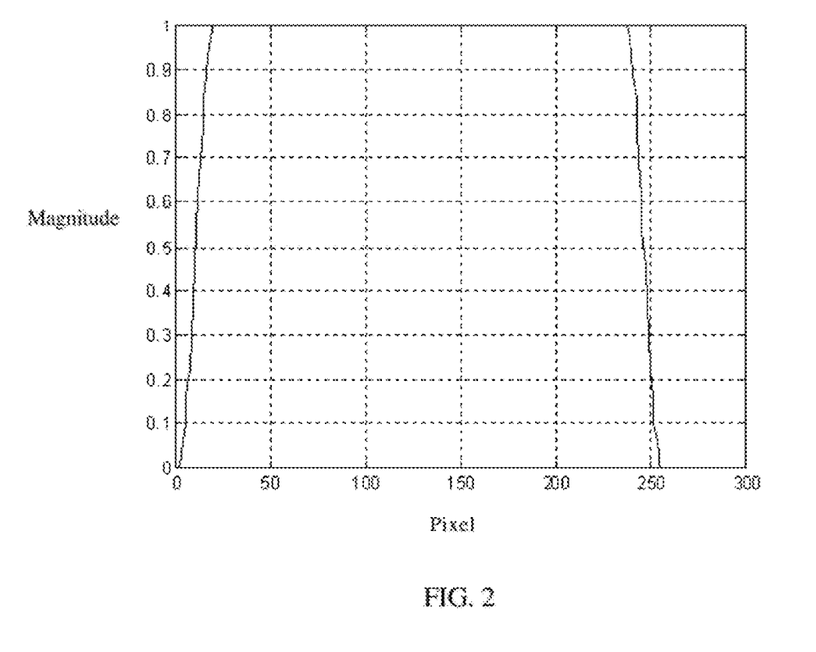
FIG. 2 illustrates a graph of a one-dimensional Tukey windowing function ($\alpha=0.15$).

In step 11, windowing (e.g., with a window function) is performed on the original image 100. Windowing reduces the effects of the image edges created by a finite image size. These edges produce very strong vertical and horizontal components that can dominate the frequency response, especially if the image is cropped by the image boundaries. Since determining the skew angle of a banknote early in an overall imaging system may be advantageous for later implemented processes, the skew angle estimation process 180 may begin and be performed when only a fraction of the banknote has been captured by the imaging sensor. In such a case, an edge (e.g., the leading edge of the banknote relative to its travel path) of the image 100 is cropped, and a window function implemented to resolve the angle ambiguity caused by the false vertical edge. This is analogous to a human observer naturally separating a picture frame from the contents of the picture. FIG. 2 shows a Tukey window function with parameter 0.15 and length 256 in one dimension. Note, however, that the present invention is not limited to such specific parameters for a Tukey window function. The window is applied to one dimension of the image 100, and then may be rotated to apply to a second dimension. Since most of the values in this window are unity, multiplications are only necessary over small strips near the image edges. Also, images 100 of typical banknotes may only have significant nonzero values (i.e., greater than the background) on the right edge if only half of a banknote is utilized for the skew estimation process. This means that the window function may only be necessary for a single edge (e.g., the leading edge) of the image 100.

After windowing, the resulting image is transformed into the frequency domain using a Discrete Fourier Transform ("DFT") implemented by a Fast Fourier Transform ("FFT"). A FFT will produce a numerical result that may be shifted in order to line up the direct current ("DC") point in the center of the matrix (the component in the image that has zero voltage). After shifting the FFT, the two-dimensional ("2-D") Fourier magnitude spectrum will be in a correct order to see the radial lines. Also, a 90 degree rotation may be applied to naturally orient the spectral lines with lines in the original image 100. The Fourier Transform is sensitive to repeating patterns in an image. For example, the structured horizontal and vertical design patterns and text found in typical banknote designs, along with the banknote edges, are significant visual cues that a human observer would use to determine the "skew angle." These same large-scale patterns are picked up by the FFT and form radial lines in the spectrum.

Taking the Fourier magnitude of the image effectively gathers the linear features with random placement and constructively adds them along common angular orientations. The result is one or more lines in the Fourier magnitude spectrum oriented at an angle θi with respect to the horizontal axis. All lines in the Fourier magnitude spectrum emanate from the Fourier magnitude origin (or equivalently, the "DC" value). The result is that linear features with random placement in the image are now represented in the Fourier magnitude spectrum by lines that all start at DC but represent the slope as was present in the summed image. Consequently, linear features of the digitized image 100 with common slope are, in effect, added together in the Fourier magnitude spectrum onto a common line of common origin, and the signal strength of the summed linear features significantly rises despite noise in the Fourier magnitude spectrum.

Figure 3A:
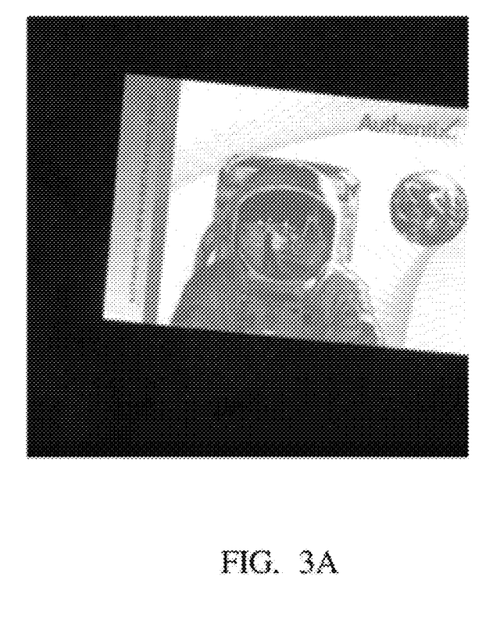
FIG. 3A shows a representation of a portion of an exemplary banknote.
Figure 3B:
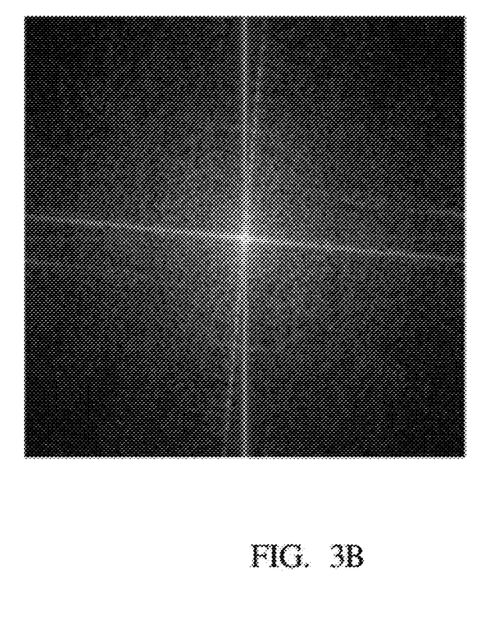
FIG. 3B shows a representation of a non-windowed Fourier Transform of the image in FIG. 3A.
Figure 4A:
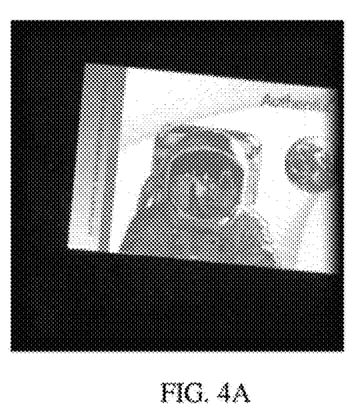
FIG. 4A shows a representation of a windowed image of a portion of an exemplary banknote.
Figure 4B:
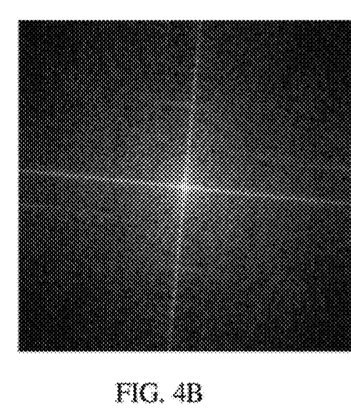
FIG. 4B shows a representation of a Fourier Transform of the image in FIG. 4A.

FIG. 3A is a 256×256 image of a typical banknote with an exaggerated skew angle. The adjusted 2-D FFT spectrum of this image without windowing is shown in FIG. 3B. Note that the spectrum adjustment includes a 90 degree rotation so that vertical lines in the original image tend to produce vertical lines in the rotated spectrum. The spectrum contains a very distinct orthogonal cross at the same rotation angle as the original image. Additionally, there is a strong vertical line in the spectrum corresponding to the vertical line created by the right edge of the image border. To mitigate the effect of the image border, application of a window function smooths out the image at the borders. FIG. 4A shows the image after windowing, and FIG. 4B shows the corresponding adjusted spectrum. Notice that the window has eliminated the vertical line in the spectrum without affecting the angled orthogonal cross. The artificial edge created by the right side of the image border is eliminated from consideration in the frequency domain. If a window is not used, as in FIGS. 3A-3B, it is possible that a skew determination process could lock on to the false vertical edge instead of the true skew angle of the banknote.

Figure 5:
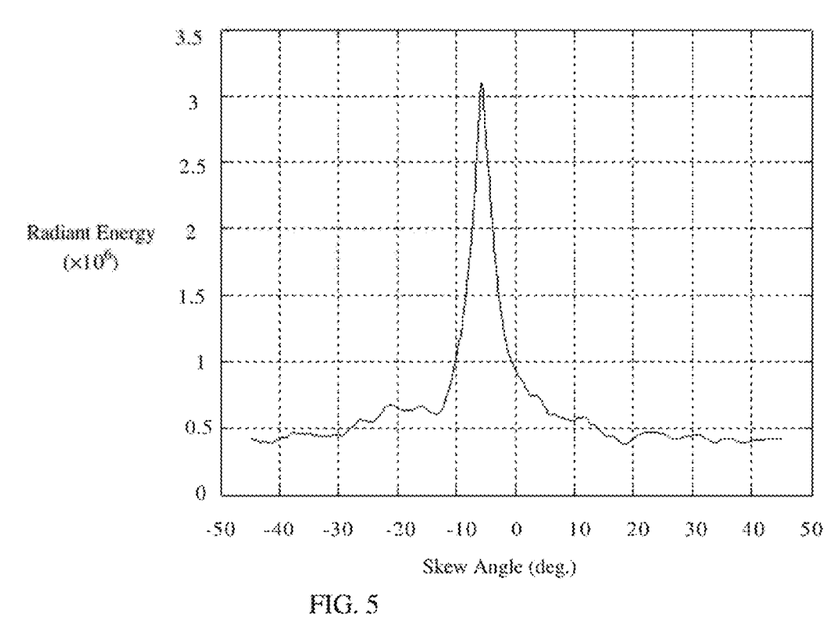
FIG. 5 illustrates a graph of a result of radial line integration (N=50).

After the 2-D FFT produces the spectrum of the windowed image, an orthogonal radial line integration is performed in step 13. Radial line integration 13 is performed on the Fourier magnitude spectrum by summing the magnitude values along a given line orientation, and repeating this summation over a range of angles. Referring to FIG. 5, radial line integration produces a radial line integration function that represents the summed Fourier magnitude value as a function of the angle θ1. The radial line integration function is analyzed by a peak value selection step to determine a peak value of the radial line integration function results. The angle that corresponds to the peak value is chosen as an estimated skew angle 170 for original image 100. The estimated skew angle 170 may be displayed on a computer monitor in embodiments (e.g., see FIG. 13); more generally, the estimated skew angle 170 is provided as an output signal, such as an encoded digital signal that is indicative of the calculated skew angle θskew 170.

The orthogonal radial line integration value for a given angle $\theta_i$ can be approximated by a summation of discrete radii and is given by:

$$s(\theta_i) = \sum_{j=1}^{N} [DTFTMAG(r_j\cos\theta_i, r_j\sin\theta_i) + DTFTMAG(-r_j\sin\theta_i, r_j\cos\theta_i)]$$

where rj is the j-th radius, N is the total number of evaluated radii, and DTFTMAG is the magnitude of the two-dimensional ("2-D") Discrete-Time Fourier Transform ("DTFT") in rectangular coordinates. The DTFT is a continuous function unlike the DFT, which only contains frequency response values at discrete points. The 2-D DFT magnitude function can be linearly interpolated to approximate the 2-D DTFT. Note that the linear interpolation technique will have a significant effect on angular resolution. Something more sophisticated than bilinear interpolation, such as cubic interpolation, is required to achieve angular resolutions better than 0.25 degrees.

The summation of radii should start at a minimum radius of 10% of the largest radius that can fit within the total DFT rectangle and extend to this largest radius. The points near the origin are excluded in a simple attempt to implement high-pass filtering (eliminating the effects of a DC offset). The maximum radius is half the distance of the DFT's shortest side. Increasing N will improve the estimate at the expense of processing power. As described herein, setting N to 50 provides a good compromise.

Alternatively, the radial summations may be performed using a radius that extends past the DFT rectangle and wraps around to the other side to take advantage of aliased energy. In this case, the dimension of the point that exceeds the DFT rectangle bound is reduced by the DFT rectangle dimension so that the radius appears to wrap around to the other side. Advantages of collecting this aliased energy are an improved signal-to-noise ratio due to collecting more signal energy and greater angle resolution due to observing points that are further from the center.

The radial line integration produces an estimate of radial energy for a given rotation angle along the main radius plus the orthogonal radius. The orthogonal radius is added because the visual structure of a typical banknote contains both horizontal and vertical elements. For banknotes with features predominately in only one direction, the orthogonal radius contribution may be optionally deleted or ignored (or even not determined). This radial energy estimation function is evaluated over several angles and the peak detector chooses the angle that produces the highest radial energy. The specific angle pair that contains the most energy is the one that lines up with the most visual patterns. Typically, this coincides with the true skew angle of the banknote. The number of angles to evaluate is driven by the maximum expected skew angle and the desired angular resolution. The global peak of this curve is the determined skew angle of −5.7 degrees for the exemplary image in FIGS. 4A-4B. Although the aliased energy is not captured in this example, FIG. 4B shows the lines wrapping around to the other side of the FFT spectrum. In an alternate embodiment, these extended lines may be captured by wrapping longer radii.

Figure 6:
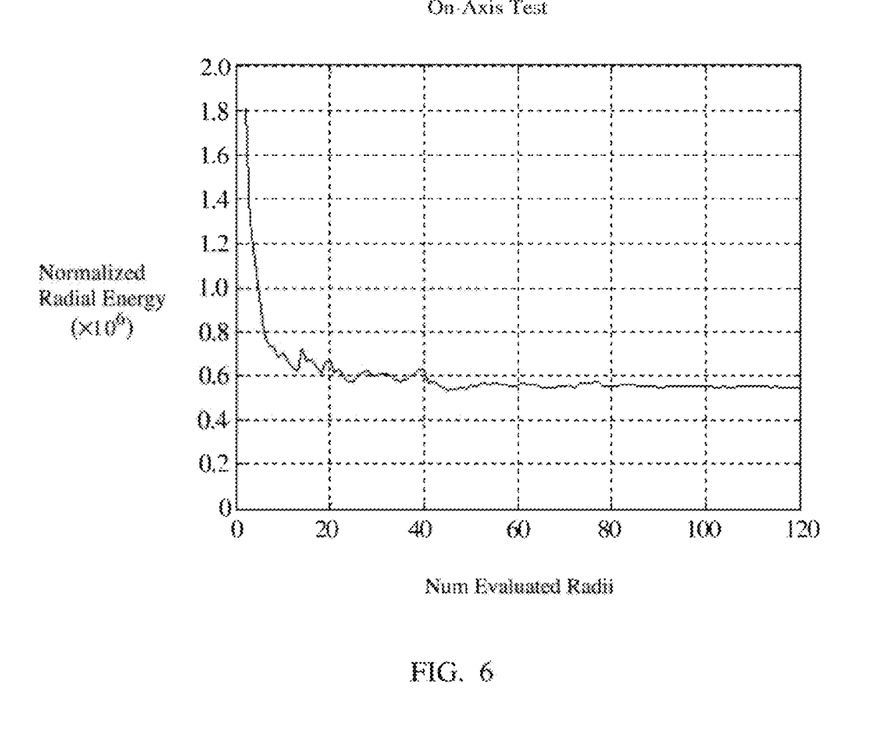
FIG. 6 illustrates a graph showing an effect of N on radial integration at the strongest angle.

To help select the number of points in the radial integration, a simulation was run where the number of points on the radius was changed and the resulting integration results were recorded. FIG. 6 shows the results of that analysis. The results begin to stabilize with 10 points of integration and are very stable with 50 points. In embodiments, the value is 50 points or less.

Figure 10:
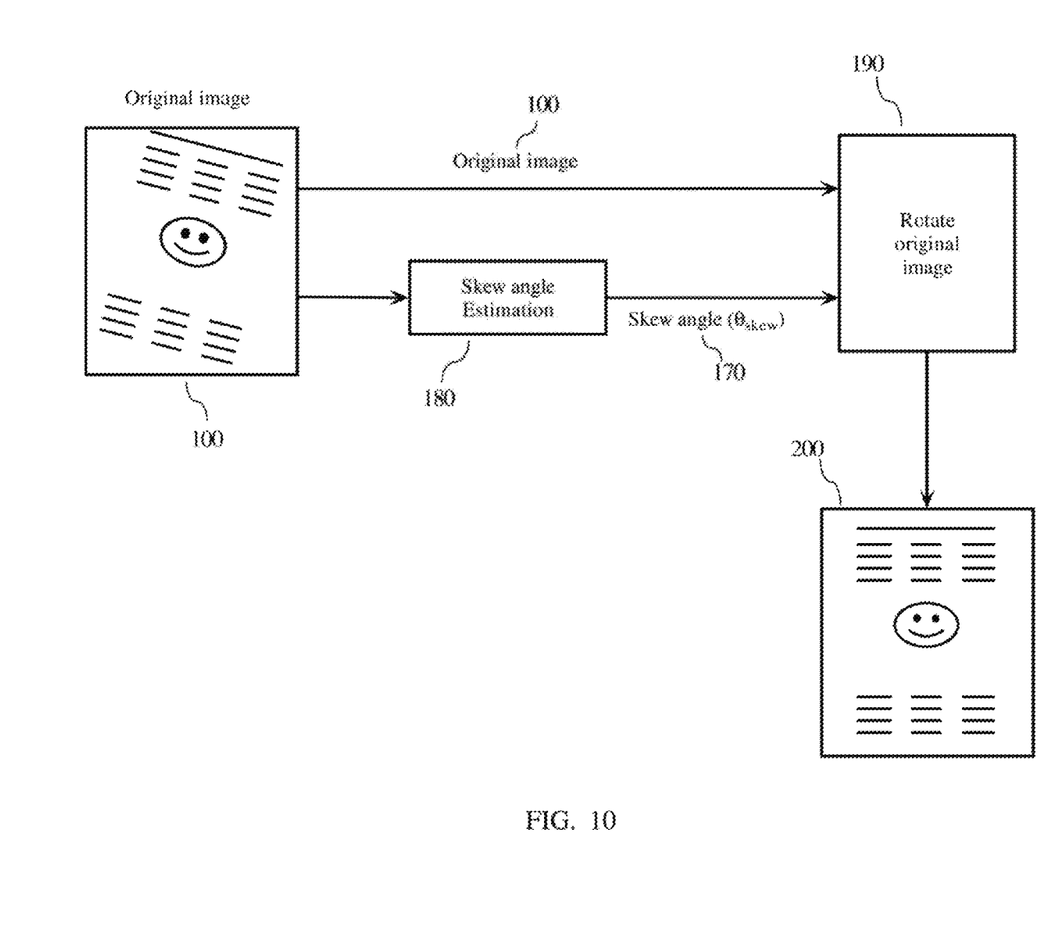
FIGS. 10-14 illustrate embodiments of the present invention.

Referring to FIG. 10, a skew angle estimation 180 is then used to correct the skew of the original image 100. The skew angle estimation produces a skew angle 170. An image rotation step 190 accepts the skew angle 170 and the original image 100 and produces a corrected image 200. The image rotation step 190 may be executed using a variety of image rotation algorithms that are well known to those skilled in the art. It is noted that the original image may be rotated by the negative of the skew angle 170 in order to correct for the unwanted skew.

Figure 7:
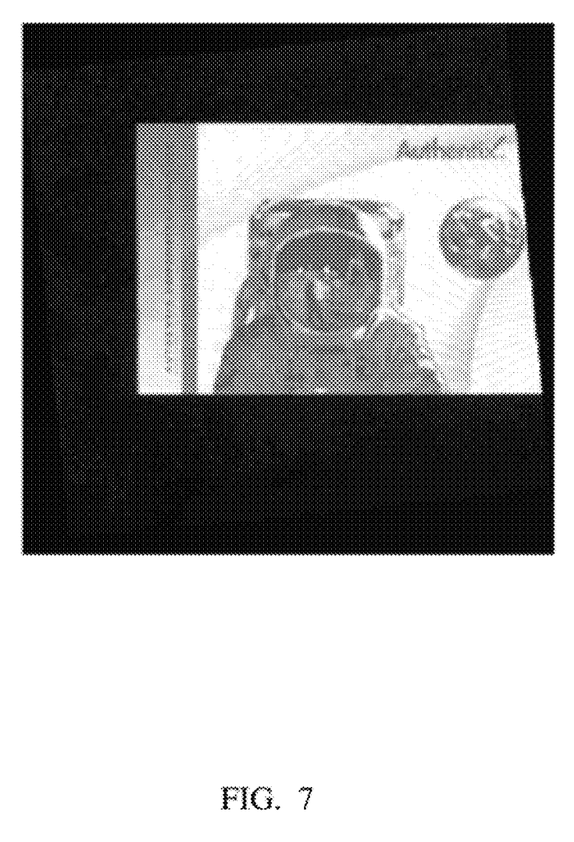
FIG. 7 shows a representation of an image of a portion of an exemplary banknote rotated by an estimated skew angle.

FIG. 7 shows the original image from FIG. 4A rotated by the estimated skew angle correction 170, confirming that the process estimated the correct skew angle.

Figure 8A:
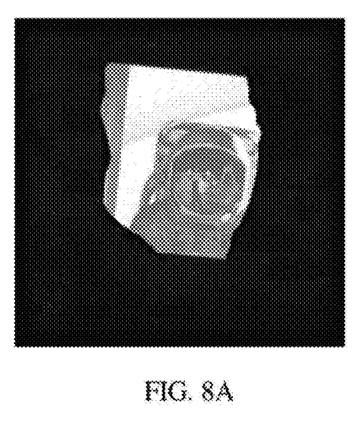
FIG. 8A shows a representation of a windowed image fragment of an exemplary banknote.
Figure 8B:
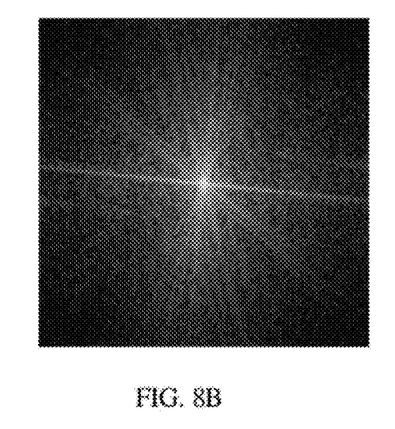
FIG. 8B shows a representation of a Fourier Transform of the image in FIG. 8A.

The following describes an example demonstrating the robustness of the skew estimation process. FIG. 8A is a windowed 256×256 image of a partial banknote fragment, which is significantly torn. This image 100 was entered into the process 10 (see FIG. 1) to estimate the skew angle. A windowing step 11 may optionally be performed on the image 100. After step 12, the adjusted spectrum shown in FIG. 8B still has a significant component rotated by the angle of the fragment.

Figure 9:
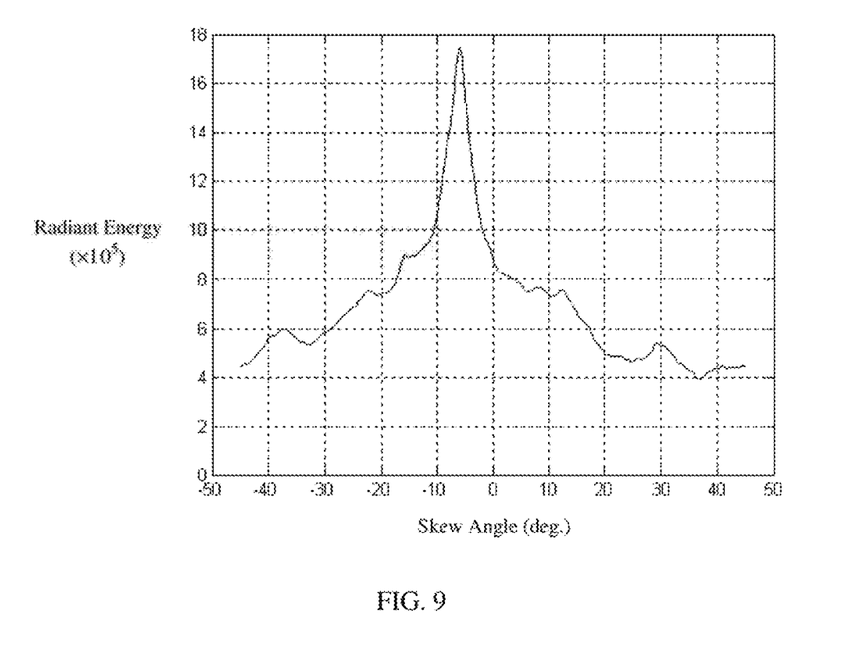
FIG. 9 illustrates a graph of a result of a radial line integration for the fragment in FIGS. 8A-8B (N=50).

The result of the radial integration 13 is shown in FIG. 9. The global peak is at −5.9 degrees, which corresponds to the skew angle 170 of the fragment. This example demonstrates the power of the system and process to accurately estimate skew angles from arbitrary banknote fragments.

Figure 11:
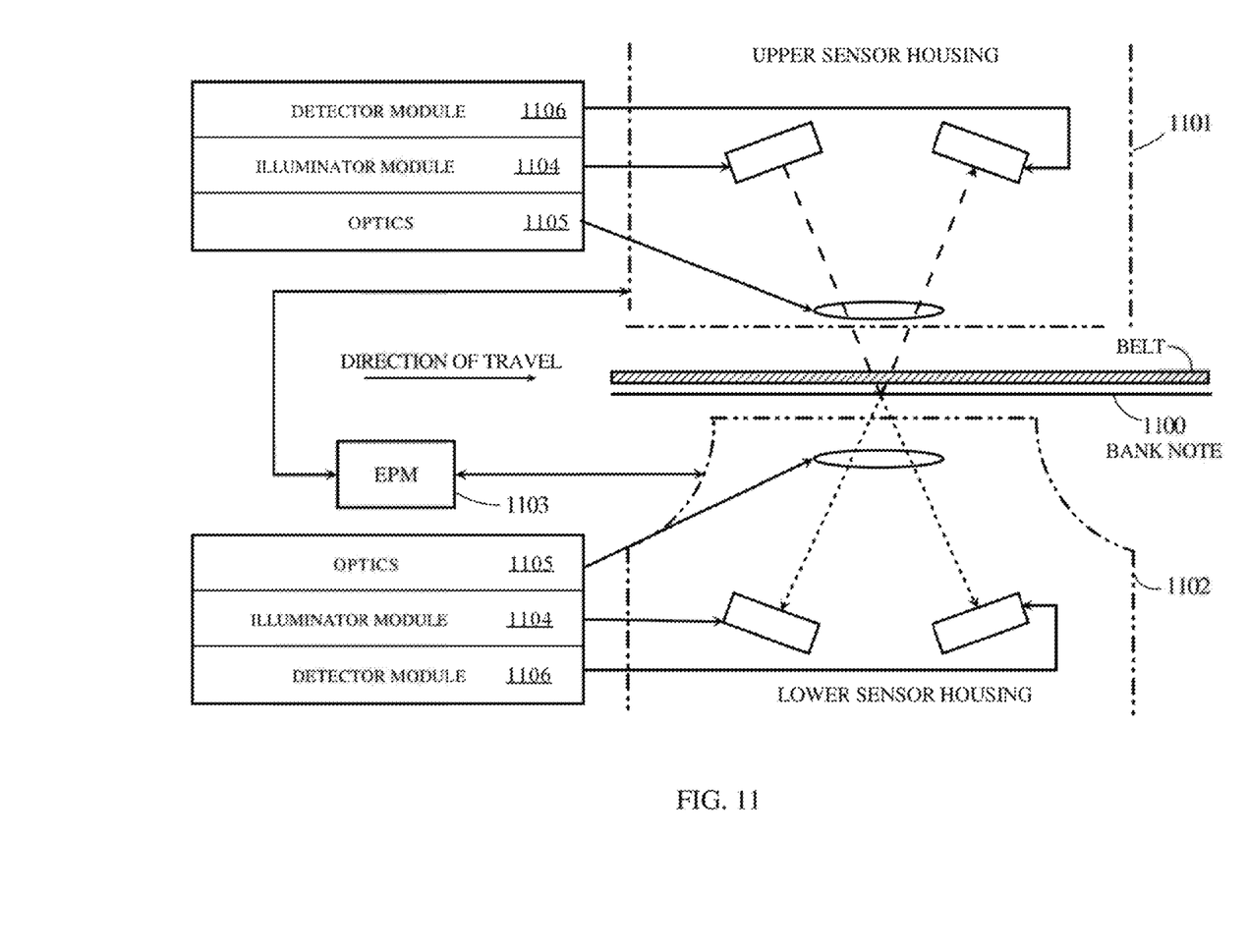

FIG. 11 illustrates a block diagram of an overall sensor system for sensing, imaging, and analyzing a target or object according to embodiments of the present invention, and as further described in PCT Publication No. WO 2011/047235, which is hereby incorporated by reference herein. The system illustrated may include a skew determination system 180 as one of its functionalities. However, implementation of a skew determination system and process is not limited to utilization within such an overall system. The illustrated sensor system comprises three subsystems, for example, an upper sensor housing ("USH") 1101, a lower sensor housing ("LSH") 1102, and an external processor module ("EPM") 1103. The external processor module 1103 may reside at a remote location, or the EPM 1103 may be co-located with the USH 1101 and LSH 1102. A skew determination system and process 180 may be implemented within the EPM 1103.

Authentication operations as well as other imaging-based measurements, such as determination of the banknote denomination, facing, orientation, skew, etc., may be initiated by a back-scatter imaging mode of the sensor system. In this back-scatter mode of operation, light is transmitted from an illuminator module 1104, strikes (impinges) a surface of the banknote 1100 as it travels along the banknote transport path (such as implemented with a typical belt transport conveyor system), and reflected light is scattered back into the housing (either or both of the USH 1101 and LSH 1102), through the optics 1105, and onto a housing's detector module 1106.

The above-noted procedure of transmitting light towards the banknote 1100 may be performed on both sides of the banknote 1100 as illustrated in the upper sensor housing 1101 and the lower sensor housing 1102. The results (e.g., scanned images 100) obtained by the upper sensor housing 1101 and/or the lower sensor housing 1102 are forwarded to the EPM 1103 for processing. In FIG. 11, the paths traveled by the light waves within the upper sensor housing 1101 are generally indicated by the dashed line; the paths traveled by the light waves within the lower sensor housing 1102 are generally indicated by the dotted line.

Figure 12:
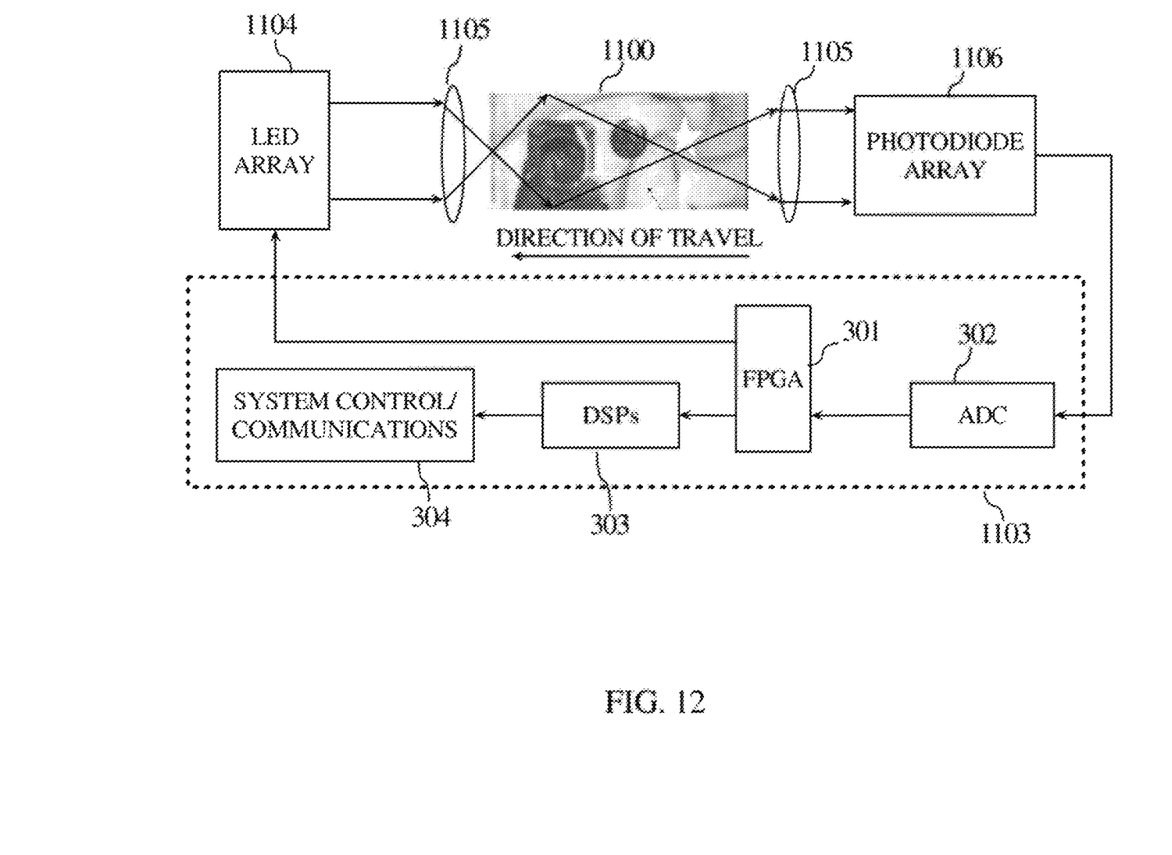

Referring to FIG. 12, as noted with respect to FIG. 11, the upper and lower housings 1101 and 1102 may each include an illuminator module 1104, which may include one or more LED arrays and accompanying LED modulators, a detector module 1106, which may include one or more imaging arrays and accompanying photodiodes/amps, optics 1105, and demodulators and data transmitters (not shown), which feed data to the EPM 1103. The EPM 1103 comprises one or more field programmable gate arrays ("FPGAs") 301, one or more digital signal processors 303, and a communications processor 304. Modulation codes may be generated inside the FPGA 301. The intensity of each set of LEDs can be adjusted individually by way of a digital-to-analog converter ("DAC") (not shown).

The FPGA 301 may also be accompanied by amplifiers (not shown) and an analog-to-digital converter ("ADC") 302 for the photodiode channels contained on the detector modules 106. The FPGA 301 may provide oversampling, filtering, and/or demodulation of the photodiode signals to maximize the signal-to-noise ratio. The FPGA 301 receives the resulting digital values and presents it to the DSP 303 in a format suitable for DSP access. The DSP 303 processes the data using embedded processes, such as discussed herein (e.g., see FIGS. 1 and 10), and may make decisions based on pass/fail criteria, and/or may authenticate the banknote 1100. The communications processor 304 may gather results from the DSP 303 and format this data into a message for output.

Example embodiments of the present invention may utilize processes implemented within the one or more DSPs 303. Document images may be obtained, manipulated, analyzed, and searched to detect and/or authenticate expected features of the document. The quality of match between detected and expected features, such as location, intensity, and reflectance spectrum, may be determined while compensating for various degrading effects such as soiling, wrinkling, translational, or rotational misalignment (i.e., skew), etc., including banknotes that have material torn from or folded under each end (e.g., see FIG. 8A). At each pixel location of all or a portion of a banknote, light intensity may be measured at a plurality of wavelengths to provide more than one image of a particular portion of the banknote.

Pixel data (e.g., original image 100) may be interpreted and fed from the FPGA 301 into a DSP 303, where spectral processing (i.e., processing of intensity versus wavelength) may be performed. Note that partitioning of the processes between a plurality of DSPs 303 may be performed, (e.g., spatial information is processed (e.g., what inks are located where), and spectral information is processed (e.g., does the spectra of the inks match what is expected)), or partitioning between a plurality of DSPs 303 may be performed by banknote. For example, each new banknote may be assigned to the next free DSP 303. Furthermore, processing may be performed by a single DSP 303.

Normalizing may be performed using a known model based on expected intensity of the paper and dark ink (i.e., by monitoring its reflectance). Normalization may be performed to compensate for faded inks, soiled paper, operational differences between LEDs and/or detectors, and associated amplifiers, etc. The image data is analyzed to measure intensity distribution and spatial alignment, then translated, and scaled to normalize for subsequent processing. More specifically, in the multi-spectral image normalization, images at each wavelength may be normalized by adaptively equalizing black and white levels. The black and white levels for each wavelength may be adaptively estimated by an iterative method of intensity histogram estimation. Offsets and gains are calculated based on the measured black and white levels at each wavelength. Images may be normalized using calculated offsets and gains.

Figure 13:
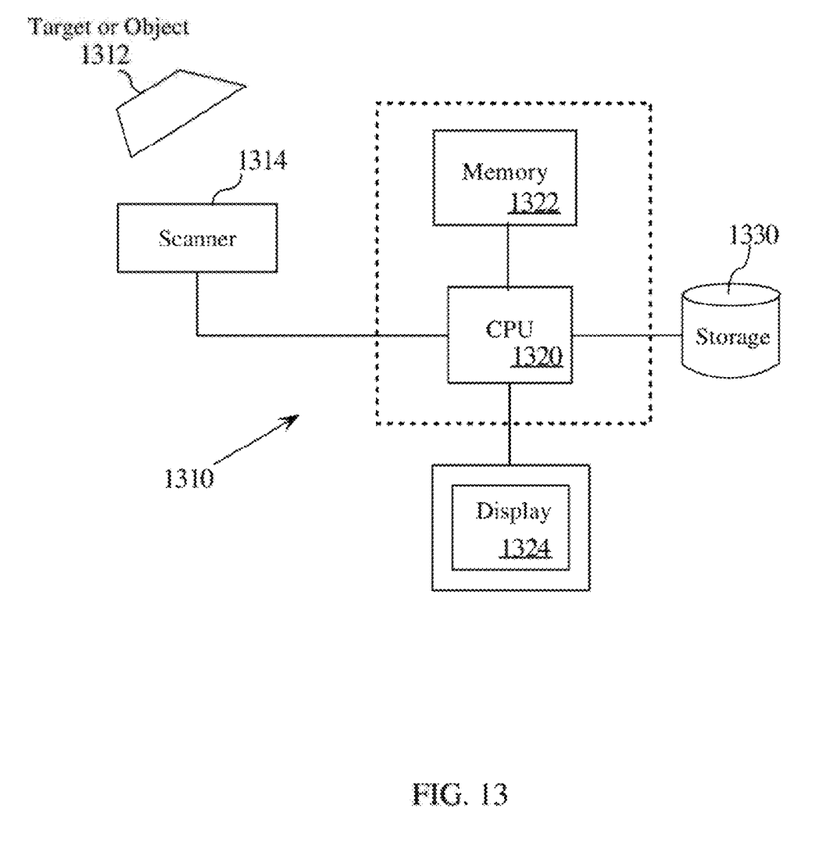

Embodiments of the present invention may be executed on a computer workstation, host processor, microprocessor, or other type of computer system. By way of example, FIG. 13 illustrates a block diagram of a computer system 1310 that may implement such embodiments. A target or object 1312 is scanned at a scanner 1314 (e.g., see FIG. 1) and provides digital image data 100 that is obtained by a control logic processor or other type of central processing unit ("CPU") 1320 and stored in an electronic memory 1322 that is associated with the computer system 1310. A CPU 1320 executes stored instructions that carry out the skew angle estimation processing described herein and may display results by sending an appropriate output signal to an associated display 1324, such as providing an appropriate digital value, for example. The display 1324 may show the original scanned image 100 from image data, as well as showing the calculated skew angle. The display 1324 may also show an image 200 with skew angle corrected by a process executed by the CPU 1320 using the output signal from the skew angle determination 180 (e.g., see FIG. 10). A storage device 1330, such as a networked storage device, may then be used to store the original and corrected image following execution of skew angle calculation and processing. When implemented on a general-purpose microprocessor, the computer program code segments implementing an embodiment of the present invention configure the microprocessor to create specific logic circuits for program logic execution. One or more encoded signals that are provided as output may be used to provide a displayed value or to provide a value to a corrective process for image de-skew (see e.g., FIG. 10).

The operations of a method or process described in connection with the embodiments disclosed herein (e.g., the skew determination system and process 180) may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

Figure 14:
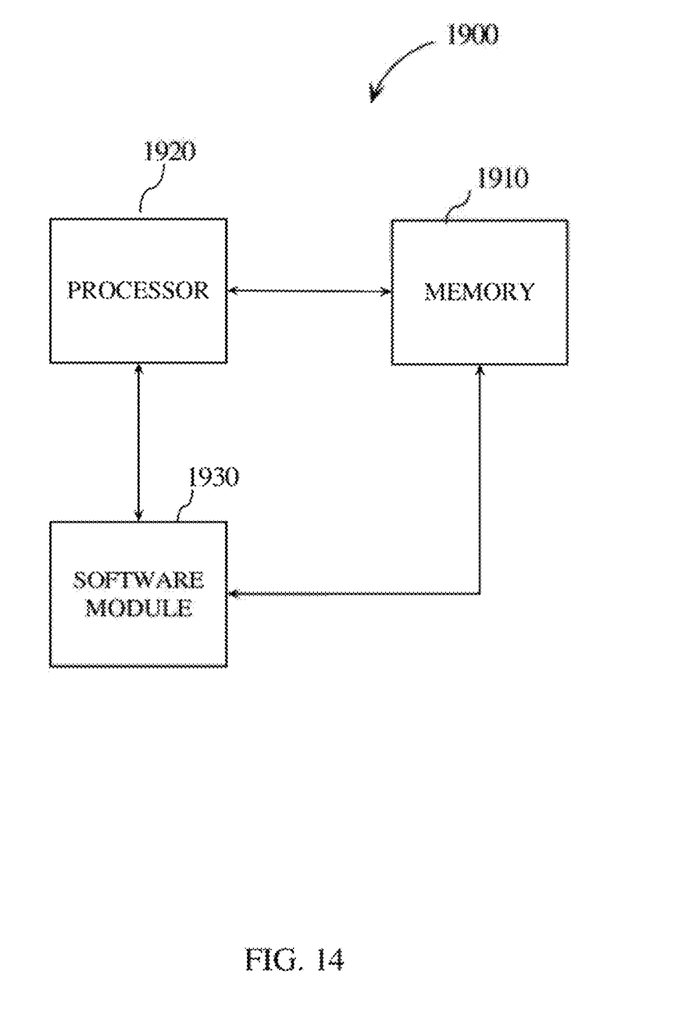

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). Alternatively, the processor and the storage medium may reside as discrete components. For example, FIG. 14 illustrates an example network element 1900. A memory 1910 and a processor 1920 may be discrete components of the network entity 1900 that are used to execute an application or set of operations. The application may be coded in software in a computer language understood by the processor 1920, and stored in a computer readable medium, such as the memory 1910. The computer readable medium may be a non-transitory computer readable medium that includes tangible hardware components in addition to software stored in memory. Furthermore, a software module 1930 may be another discrete entity that is part of the network entity 1900, and which contains software instructions that may be executed by the processor 1920. In addition to the above noted components of the network entity 1900, the network entity 1900 may also have a transmitter and receiver pair configured to receive and transmit communication signals (not shown).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof.

What is claimed is:

1. An image skew angle determining method comprising:
   receiving image data representing an image of a document into an electronic memory;
   resolving an angle ambiguity caused by a false vertical edge of the image data using a window function on the image data, wherein the using the window function comprises applying a window to a first dimension of the image, rotating the image, and applying the window to a second dimension of the image, and wherein using the window function produces windowed image data;
   performing, after the resolving the angle ambiguity, a Fourier Transform on the windowed image data, wherein the performing the Fourier Transform on the windowed image data produces transformed image data;
   performing, after the performing the Fourier Transform, a radial line integration of the transformed image data, wherein the performing the radial line integration of the transformed image data produces integrated image data;
   determining the image skew angle based on a peak value from the integrated image data; and
   outputting an electronic signal that is indicative of the image skew angle.

2. The method as recited in claim 1, wherein the performing of the radial line integration further comprises determining a first radial line integration that corresponds with the edge of the document, determining a second radial line integration orthogonal to a direction of the first radial line integration, and combining results from the first and second radial line integrations to determine the skew angle.

3. The method as recited in claim 1, wherein the image data is created by line scanning the document with a digital image scanning device.

4. The method as recited in claim 3, wherein line scanning the document comprises using a plurality of light sources for illuminating the document as the document travels past the plurality of light sources in a travel direction perpendicular to a straight line of the plurality of light sources.

5. The method as recited in claim 3, wherein the document is a banknote.

6. The method as recited in claim 4, wherein the document travels past the digital image scanning device on a moving conveyor system.

7. The method as recited in claim 1, wherein the skew angle is an angle of the document relative to a centerline of a direction of travel of the document.

8. The method as recited in claim 1, wherein smoothing a border of the image reduces effects of vertical and horizontal components in the transformed image data.

9. The method as recited in claim 1, wherein the window function is performed on two or more borders of the image.

10. The method as recited in claim 1, wherein the transformed image data represents a summation of linear features in the document along common angular orientations.

11. The method as recited in claim 1, wherein the radial line integration sums magnitude values in the transformed image data along a given line orientation, repeating this summation over a range of angles.

12. The method as recited in claim 1, wherein the radial line integration represents a summed Fourier magnitude value of the transformed image data as a function of the skew angle.

13. The method as recited in claim 1, wherein the radial line integration is produced as follows:

$$s(\theta_i) = \sum_{j=1}^{N} [DTFTMAG(r_j\cos\theta_i, r_j\sin\theta_i) + DTFTMAG(-r_j\sin\theta_i, r_j\cos\theta_i)]$$

where $r_j$ is a j-th radius, N is a total number of evaluated radii, and DTFTMAG is a magnitude of a two-dimensional Discrete-Time Fourier Transform ("DTFT") in rectangular coordinates.

14. An apparatus comprising:
a memory; and
a processor coupled to the memory, and configured to:
receive image data representing an image of an object;
resolve an angle ambiguity caused by a false vertical edge of the image data using a window function on the image data, wherein the using the window function comprises applying a window to a first dimension of the image, rotating the image, and applying the window to a second dimension of the image, and wherein using the window function produces windowed image data;
perform, after the resolving the angle ambiguity, a Fourier Transform on the windowed image data, wherein the performing the Fourier Transform on the windowed image data produces transformed image data;
perform, after the performing the Fourier Transform, a radial line integration of the transformed image data, wherein the performing the radial line integration of the transformed image data produces integrated image data; and
determine an image skew angle based on a peak value from the integrated image data.

15. The apparatus of claim 14, wherein the processor is configured to output an electronic signal that is indicative of the image skew angle.

16. The apparatus of claim 14, wherein the processor is configured to output a corrected image that represents the image of the object corrected by the image skew angle.

17. The apparatus of claim 14, further comprising a line scanner configured for scanning of the object using a plurality of light sources for illuminating the object as the object travels past the plurality of light sources in a travel direction perpendicular to a straight line of the plurality of light sources.

18. The apparatus of claim 14, wherein the transformed image data represents a summation of linear features in the object along common angular orientations.

19. The method of claim 4, wherein a plurality of light detectors captures light scattered by the document as a result of the illuminating of the document by the plurality of light sources.

20. The method of claim 1, wherein the performing the Fourier Transform on the windowed image data determines a Fourier magnitude for at least two edges of the document.

21. The apparatus of claim 17, further comprising a plurality of light detectors in signal communication with the processor, wherein the plurality of light detectors captures light scattered by the object as a result of the illuminating of the object by the plurality of light sources.

22. The apparatus of claim 17, wherein the performing the Fourier Transform on the windowed image data determines a Fourier magnitude for at least two edges of the object.

23. The method of claim 1, wherein the window function is a Tukey window function.

24. The method of claim 1, wherein the using the window function eliminates a representation of the false vertical edge in a frequency domain.

* * * * *